(12) United States Patent
Courtney

(10) Patent No.: US 10,065,254 B2
(45) Date of Patent: Sep. 4, 2018

(54) DUAL-HAND CUTTER HEAD FOR GEAR MANUFACTURE

(71) Applicant: THE GLEASON WORKS, Rochester, NY (US)

(72) Inventor: Joseph A. Courtney, Rochester, NY (US)

(73) Assignee: THE GLEASON WORKS, Rochester, NY (US)

( * ) Notice: Subject to any disclaimer, the term of this patent is extended or adjusted under 35 U.S.C. 154(b) by 323 days.

(21) Appl. No.: 14/440,666

(22) PCT Filed: Nov. 8, 2013

(86) PCT No.: PCT/US2013/069021
§ 371 (c)(1),
(2) Date: May 5, 2015

(87) PCT Pub. No.: WO2014/078174
PCT Pub. Date: May 22, 2014

(65) Prior Publication Data
US 2015/0298230 A1 Oct. 22, 2015

Related U.S. Application Data

(60) Provisional application No. 61/725,594, filed on Nov. 13, 2012.

(51) Int. Cl.
*B23F 21/22* (2006.01)
*B23F 21/16* (2006.01)
*B23F 21/23* (2006.01)

(52) U.S. Cl.
CPC .......... *B23F 21/166* (2013.01); *B23F 21/226* (2013.01); *B23F 21/236* (2013.01);
(Continued)

(58) Field of Classification Search
CPC .... B23F 21/226; B23F 21/126; B23F 21/128; B23F 21/22; B23F 21/223; B23F 21/166; Y10T 409/101431; Y10T 409/10159; Y10T 409/101749; Y10T 409/101908; Y10T 409/104134; Y10T 409/105247; Y10T 409/105406; Y10T 409/106042;
(Continued)

(56) References Cited

U.S. PATENT DOCUMENTS 1,927,409 A * 9/1933 Markstrum ........... B23C 5/2458
407/35
4,038,732 A * 8/1977 Hunkeler ............. B23F 21/226
407/29
(Continued)

FOREIGN PATENT DOCUMENTS

CN 201543918 U 8/2010
DE 102007038935 A1 2/2009
(Continued)

OTHER PUBLICATIONS

JP 2010-179409 Machine translation, pp. 1-19, Feb. 22, 2017.*
International Search Report and Written Opinion for PCT/US2013/069021, ISA/EPO, dated Apr. 3, 2014, pp. 11.

*Primary Examiner* — Daniel Howell
*Assistant Examiner* — Nicole N Ramos
(74) *Attorney, Agent, or Firm* — Robert L. McDowell

(57) ABSTRACT

A cutter head (40) having cutting blade positioning slots (50, 52) wherein a portion of the positioning slots accommodate cutting blades (42) for right-hand cutting and another portion of the positioning slots accommodate cutting blades (46) for left-hand cutting.

12 Claims, 5 Drawing Sheets

(52) U.S. Cl.
CPC ........ *Y10T 407/171* (2015.01); *Y10T 407/174* (2015.01); *Y10T 407/1705* (2015.01); *Y10T 409/10159* (2015.01); *Y10T 409/101431* (2015.01); *Y10T 409/101908* (2015.01)

(58) Field of Classification Search
CPC . Y10T 409/106678; Y10T 409/106837; Y10T 409/106996; Y10T 409/107155; Y10T 409/107314; Y10T 407/1705; Y10T 407/171; Y10T 407/1715; Y10T 407/1725; Y10T 407/1735; Y10T 407/174; Y10T 407/1745
USPC ................ 409/13, 17, 26, 27, 28, 38, 39, 51
See application file for complete search history.

(56) References Cited

U.S. PATENT DOCUMENTS

| | | | | |
|---|---|---|---|---|
| 4,565,474 A | * | 1/1986 | Charles | B23F 5/20 409/38 |
| 5,145,294 A | * | 9/1992 | Flueckiger | B23C 5/2221 407/113 |
| 5,477,755 A | * | 12/1995 | Blakesley | B23F 21/226 407/115 |
| 5,542,794 A | * | 8/1996 | Smith | B23C 5/006 407/35 |
| 6,311,590 B1 | * | 11/2001 | Stadtfeld | B23F 21/226 407/20 |
| 6,896,017 B2 | * | 5/2005 | Rankin, Sr. | B27G 13/04 144/174 |
| 2011/0150586 A1 | * | 6/2011 | Fang | B23C 5/2208 407/69 |

FOREIGN PATENT DOCUMENTS

| | | | | |
|---|---|---|---|---|
| EP | 1240966 A2 | | 9/2002 | |
| GB | 537399 A | | 6/1941 | |
| GB | 695249 A | * | 8/1953 | ............ B23F 21/226 |
| JP | 2010179409 A | * | 8/2010 | |
| WO | 2011/087759 A1 | | 7/2011 | |

\* cited by examiner

DUAL-HAND CUTTER HEAD FOR GEAR MANUFACTURE

This application claims the benefit of U.S. Provisional Patent Application No. 61/725,594 filed Nov. 13, 2012, the entire disclosure of which is hereby incorporated by reference.

FIELD OF THE INVENTION

The present invention is directed generally to cutting tools for cutting bevel and hypoid gears. In particular, the present invention is directed to cutter heads for manufacturing bevel gears.

BACKGROUND OF THE INVENTION

In the manufacture of bevel and hypoid gears, the cutting tools utilized are primarily face mill or face hob cutters. The cutters generally comprise cutting blades formed from a length of bar stock material (e.g. high-speed steel or carbide) having a base or shank portion and a cutting end portion, including at least one cutting edge, at one end, or at both ends, of the base or shank. A plurality of cutting blades are usually arranged about a cutter head with the cutting ends of the blades projecting from a face of the cutter head. Such types of cutting tools are well known in the art of gear manufacture.

In face mill cutters, a plurality of cutting blades are arranged about a circle in a cutter head such that one tooth slot is formed with each plunge of the cutter and the cutter must be withdrawn and the workpiece indexed to the next tooth slot position in order to form the next tooth slot (i.e. intermittent indexing). Face milling cutters usually comprise alternating inside and outside cutting blades that cut, respectively, inside and outside portions of a tooth slot. Face mill cutters may also comprise successive cutting blades that remove stock material from the entire tooth slot, such as is disclosed in U.S. Pat. No. 1,236,834 to Gleason, U.S. Pat. No. 1,667,299 to Wildhaber or US 2007/0011855 to Ribbeck. If desired, one or more "bottom" cutting blades may be included for removal of stock material from the bottom or root portion of a tooth slot.

Face hobbing comprises cutting blades arranged about a cutter, not in line with each other, but in groups, with usually two or three cutting blades per group. In two-blade groups, such as disclosed by U.S. Pat. Nos. 4,575,285 to Blakesley; 4,621,954 to Kitchen et al. and 4,525,108 to Krenzer, the blade pair comprises an inner cutting blade and an outer cutting blade. In the three-blade group, such as disclosed by U.S. Pat. No. 3,760,476 to Kotthaus, a "bottom" cutting blade is included along with an inside and outside cutting blade. Unlike most face milling processes, in which all cutting blades pass through the tooth slot during its formation, face hobbing comprises each successive group of cutting blades passing through respective successive tooth slot with each blade in the group forming a cut completely along the longitudinal portion of the tooth slot. The cutter and the workpiece rotate in a timed relationship with each other thereby allowing continual indexing of the workpiece and continual formation of each tooth slot of the gear. Thus, in face hobbing, a single plunge of the cutting tool results in all tooth slots of the workpiece being formed (i.e. continuous indexing).

Cutting blades may be made of any suitable tool material such as conventional or powered metal hardened high speed steel (HSS) of any alloy composition (such as, for example, M2, M4, Rex 45, Rex 54, Rex 76, T15, Rex 121 or others) or made of carbide hard metal of any alloy composition, such as P and K grades. The wear surfaces of cutting blades may be coated (and recoated after sharpening) with PVD single or multi-layer coatings consisting of any commercially available wear coating or combination of wear coatings such as, for example, TiN, TiCN, TiAlN, AlTiN, CrAlN, ZrN, CrN and others. Gear cutting operations may be performed utilizing a coolant or lubricant (i.e. wet cutting) or may be carried out in the absence of any such coolant or lubricant (i.e. dry cutting). Dry cutting operations are usually performed utilizing cutting blades comprising carbide materials.

In face hobbing processes, and with most face milling processes, a left hand cutter (having blades which cut in a counterclockwise direction when viewing the back of the cutter) is utilized to cut a left hand gear. The "hand" (left or right) of a gear is the direction of inclination of the gear teeth as viewed from the face of the gear (ring gear or pinion for a bevel gear set) at the 12 o'clock position. Thus, it can be seen that since a left hand member of a gear set mates with a right hand member of the gear set, a right hand cutter is utilized to cut the right hand member of the gear set. Therefore, for cutting both members of a gear set, two cutters (left hand and right hand) are usually employed.

As mentioned above, the cutting blades of a face hobbing cutter are arranged in blade groups, with the blades of one group passing through one slot, while the blades of the following group pass through the following slot of the part. This cutting sequence requires a certain arrangement (regarding radial location and tangential offset) of the blades in one group, which repeats for each group. It can be understood that with respect to a left hand cutter, the cutter to cut a right hand part is a mirror image of the left hand cutter regarding cutting direction and blade orientation within one blade group. For example, a left hand pinion mates with a right hand gear, which in face hobbing requires a pair of cutters (one left hand and one right hand) in order to cut the two mating members (pinion and ring gear) of a bevel gear set.

The present invention eliminates the need for two cutter heads particularly for face hobbing. A single cutter head is proposed thereby reducing the expense of producing mating members of a gear set.

SUMMARY OF THE INVENTION

The invention comprises a cutter head having cutting blade positioning slots wherein a portion of the positioning slots accommodate cutting blades for right-hand cutting and another portion of the positioning slots accommodate cutting blades for left-hand cutting.

DETAILED DESCRIPTION OF THE PREFERRED EMBODIMENT

Figure 1:
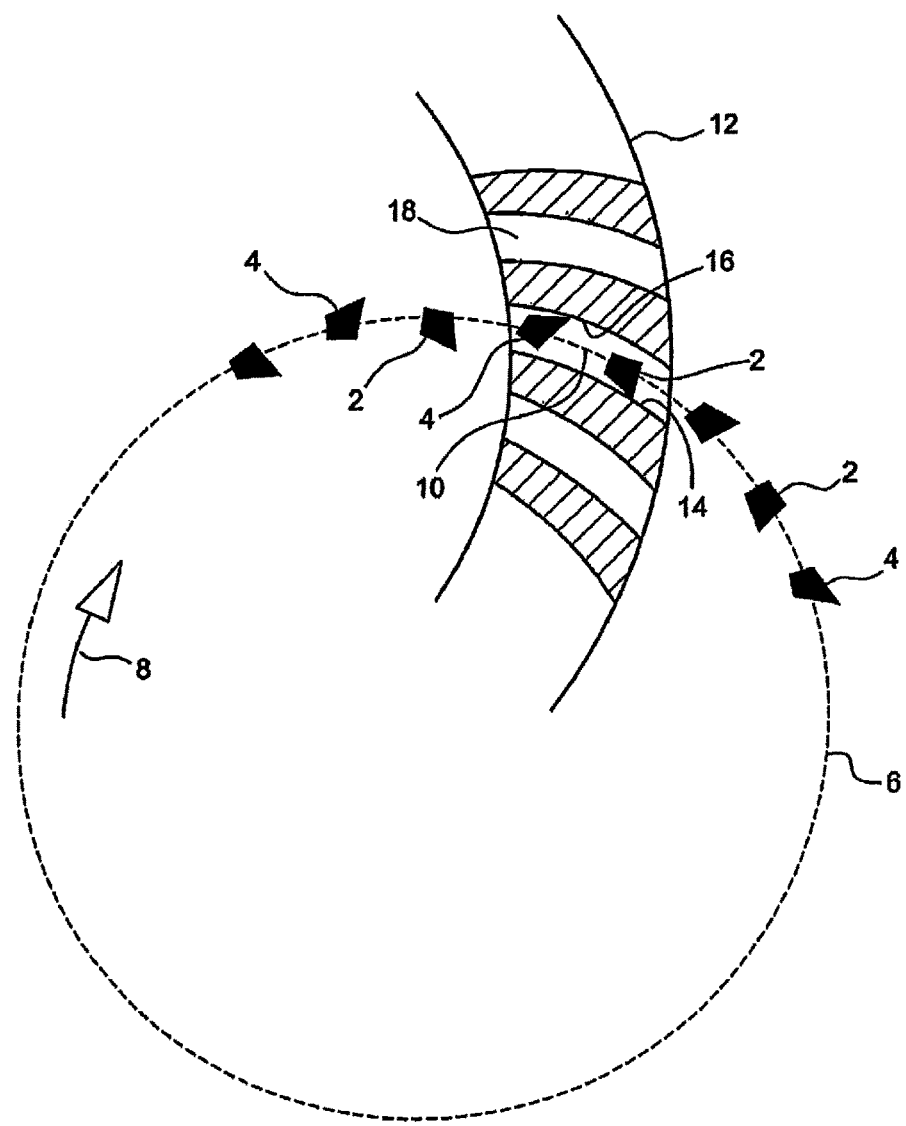
FIG. 1 illustrates a face milling process for producing gears.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., as may be used herein are used for purposes of description and are not intended to indicate or imply importance or significance unless specified.

FIG. 1 represents an example of an alternating blade type face milling cutter comprising inside cutting blades 2 and outside cutting blades 4 arranged in line with one another (e.g. on circle 6) on a cutter head (not shown). For illustrative purposes, only a portion of the total number of cutting blades 2, 4 are shown. The cutting blades 2, 4 are rotated in the direction of arrow 8 to form a tooth slot 10 of a work piece represented at 12. Inside cutting blades 2 cut the respective inside flank surface 14 of the tooth slot 10 while outside cutting blades 4 cut the respective outside flank surface 16 of the tooth slot 10. All cutting blades 2, 4 of the cutter pass through a single slot of the workpiece during cutter rotation. The cutting blades 2, 4 are fed in, relative to the work piece 12, until a final tooth slot depth is reached. The cutter is then withdrawn, the work piece is indexed to the position of another tooth slot (18 for example), and cutting is resumed. This sequence is repeated until all tooth slots of the workpiece have been formed.

Figure 2:
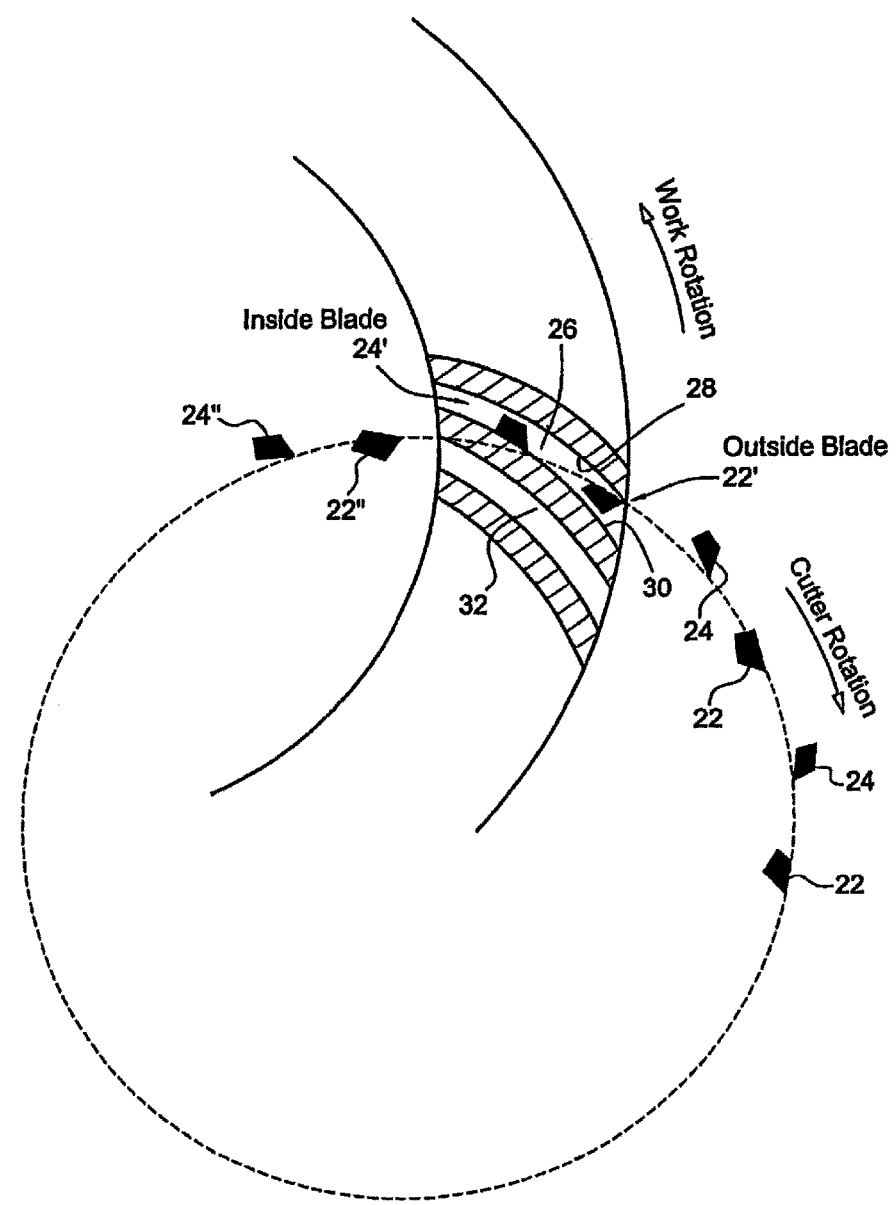
FIG. 2 illustrates a face hobbing process for producing gears.
Figure 3:
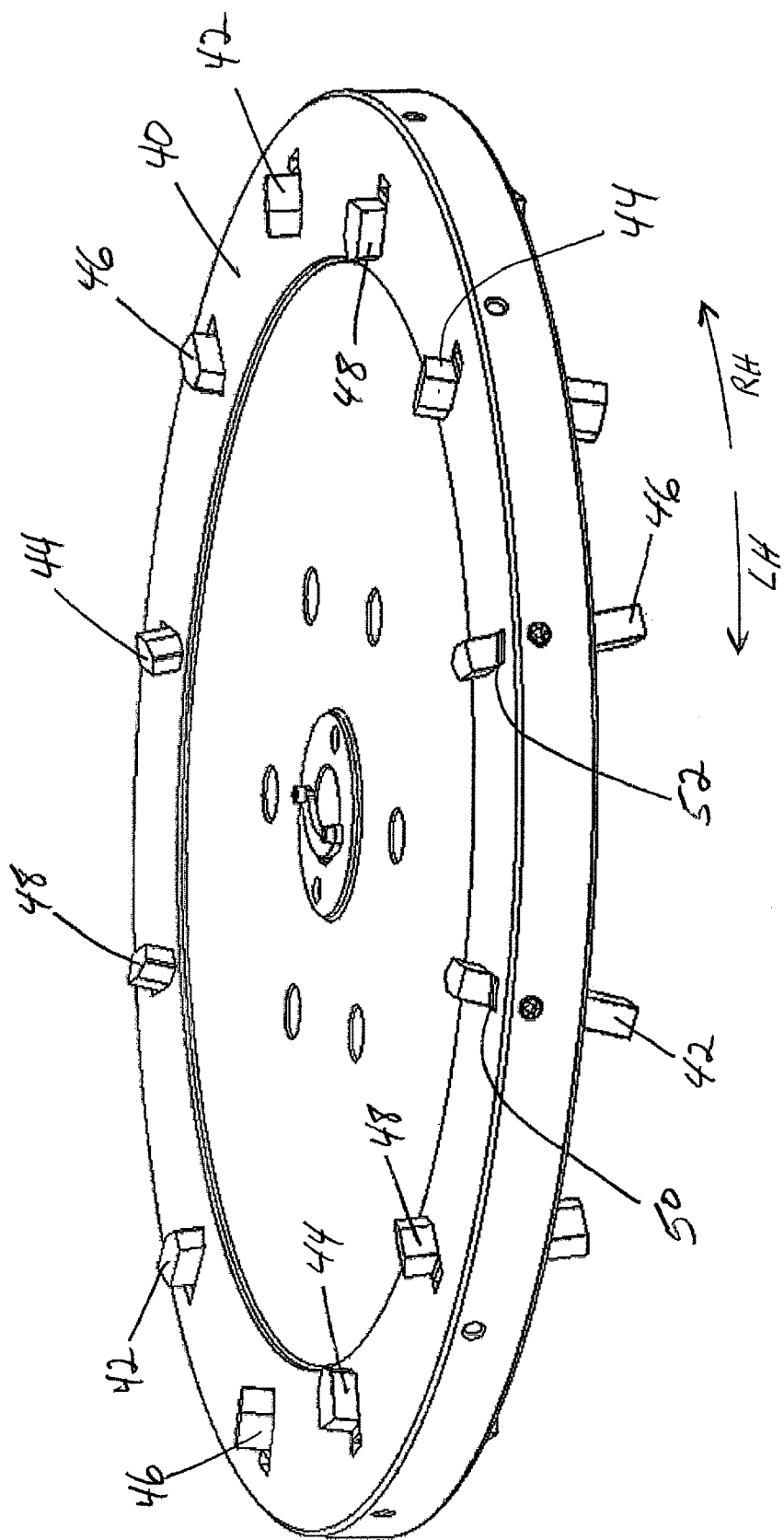
FIG. 3 shows the inventive cutter head comprising left hand and right hand cutting blade position slots and cutting blades.

FIG. 2 illustrates an example of the face hobbing method of gear manufacture. Face hobbing comprises cutting blades arranged about a cutter, not in line with each other, but in groups, with usually two or three cutting blades per group. In FIG. 3, two cutting blades per group (outside cutting blade 22 and inside cutting blade 24) are shown. For illustrative purposes, only a portion of the total number of cutting blade groups (i.e. cutting blades 22, 24) are shown.

Unlike most face milling processes, in which all cutting blades pass through a tooth slot during its formation, face hobbing comprises each successive group of cutting blades 22, 24 passing through respective successive tooth slots with each blade in the group forming a cut completely along the longitudinal portion of the tooth slot. In FIG. 2, for example, the group of cutting blades 22' and 24' cut respective outside surface 28 and inside surface 30 of tooth slot 26 while the successive group of cutting blades 22" and 24" cut corresponding surfaces in the next tooth slot 32. The cutter and the workpiece rotate in a timed relationship with each other thereby allowing continual indexing of the workpiece and continual formation of each tooth slot of the gear. Thus, in face hobbing, a single plunge of the cutting tool results in all tooth slots of the workpiece being formed.

As discussed above, for cutting both members of a gear set, two cutters (left hand and right hand) are usually employed. This means two cutter heads are required, one for cutting the left hand gear member and one for cutting the right hand gear member. The inventor has discovered that considerable savings can be realized by utilizing a single cutter head for both right hand and left hand cutting.

Figure 5:
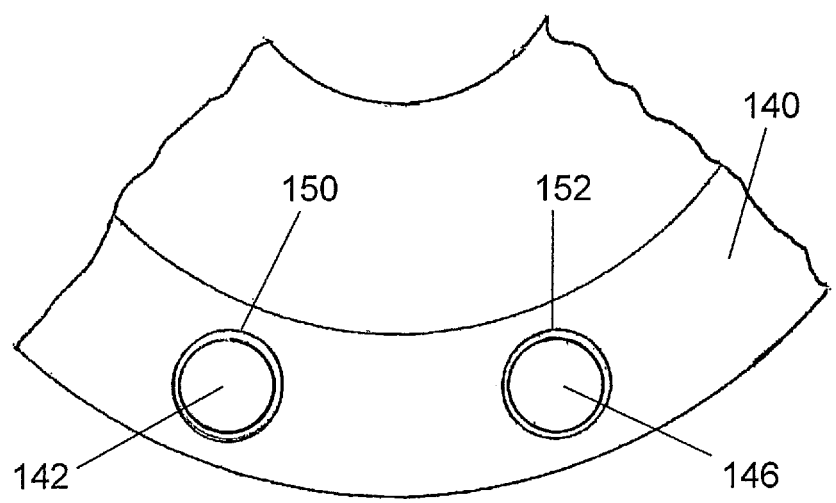
FIG. 5 is a partial top view of an exemplary cutter head comprising cutting blade positioning slots and cutting blades having respective circular cross-sections.
Figure 6:
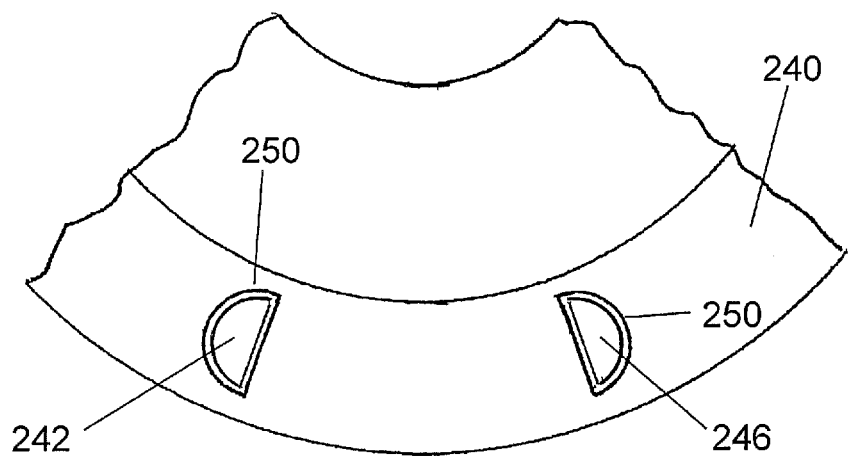
FIG. 6 is a partial top view of an exemplary cutter head comprising cutting blade positioning slots and cutting blades having a respective semi-circular cross-sections.

FIG. 3 illustrates an embodiment of the present invention comprising a face hobbing cutter head 40, rotatable about axis A (FIG. 4), having cutting blades projecting from a front face thereof. The cutter head 40 which, for example, conventionally comprises only inside cutting blades 42 and outside cutting blades 44 (three blade groups shown in FIG. 1) for right hand "RH" cutting has been modified according to the invention to also include cutter head blade positioning slots that accommodate cutting blades for left hand "LH" cutting. Such left hand cutting blades comprise inside cutting blades 46 and outside cutting blades 48. While FIG. 3 illustrates cutting blades having five sides, the present invention is not limited thereto. Any cutting blade cross-sectional shape (e.g. four-sided, circular, semi-circular, etc.) is contemplated by the invention. For example, FIG. 5 shows a partial top view of an exemplary cutter head 140 comprising cutting blade positioning slots 150, 152 having ciruclar cross-sections and cutting blades 142, 146 having circular cross-sections positioned, respectively, in slots 150, 152. As another example, FIG. 6 shows a partial top view an exemplary cutter head 240 comprising cutting blade positioning slots 250, 252 having semi-circular cross-sections and cutting blades 242, 246 having semi-circular cross-sections positioned, respectively, in slots 250, 252.

Figure 4:
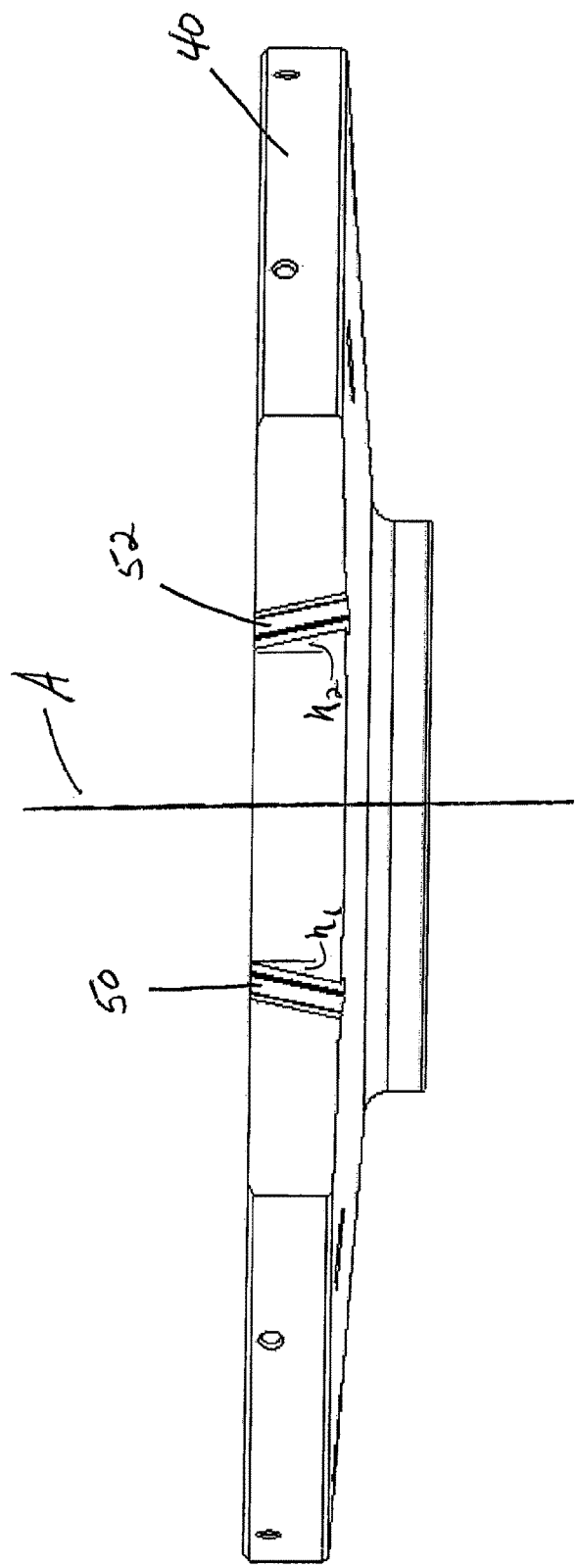
FIG. 4 is a cross-sectional view of the cutter head of FIG. 3.

FIG. 4 shows a cross-section of the cutter head of FIG. 3 wherein cutting blade positioning slots 50 (one shown) are oriented at a particular hook angle, $\eta_1$, (depending upon the particular process and/or the gear being cut) for right hand cutting while blade mounting slots 52 (one shown) for left hand cutting are oriented at a particular hook angle, $\eta_2$, (depending upon the particular process and/or the gear being cut). Hook angles $\eta_1$ and $\eta_2$ may or may not be equal. It should be noted that hook angles of zero degrees are also contemplated by the present invention especially in face hobbing cutter heads wherein an offset exists between the cutter axis and the blade slot bottom radius.

While FIGS. 3 and 4 illustrate a face hobbing cutter, the invention is equally applicable to face milling cutters including those face milling cutters having inside and outside cutting blades as well as those face milling cutters having cutting blades wherein each blade cuts the entire width of a tooth slot. The primary aspect of the invention is that a cutter head be provided with appropriate blade positioning slots such that the same cutter head may be utilized as a right-hand cutter and as a left-hand cutter.

Although FIG. 3 illustrates a cutter having three sets of inside and outside cutting blades (right and left hand), any number of cutting blade sets (or single cutting blades if full slot-width cutting) may be present depending upon the size and strength of the cutter head and the properties and geometry of the particular gear being cut. For example, certain face hobbing cutter heads such as those designed to cut bevel gears having diameters of 800 mm or less, may typically have five sets of cutting blades (either right or left hand) since sufficient cutter head space is usually available to include an additional five sets of cutter blades of the "other" hand, whereby both right hand and left hand cutting may be performed by the same cutter head, while still having a cutter head of sufficient strength to perform the cutting. It should be noted that while preferred, the number of right hand blade positioning slots and the number of left hand blade positioning slots need not be equal.

While FIG. 3 shows an alternating right-hand and left-hand blade arrangement based on individual blades (e.g. outside RH cutting blade 44 followed by outside LH cutting blade 48), the invention also contemplates alternating pairs of cutting blades, for example, inside and outside right-hand cutting blades followed by inside and outside left-hand cutting blades) or other combinations or sequences of right-hand and left-hand hand cutting blades. Furthermore, the invention is not limited to equal spacing between cutting blades but also encompasses unequal spacing between individual cutting blades or groups of cutting blades of either hand or both hands of cutter rotation.

Cutting blades for both right hand and left hand cutting may reside in the cutter head at the same time although it is not necessary. For example, if a right hand cutting process is being performed, the left hand cutting blades may be located in a withdrawn position in the cutter head so that they do not come in contact with a workpiece during the right hand cutting. When it is time for left hand cutting, the right hand cutting blades are "pushed back" to a withdrawn position and the left hand cutting blades are advanced to their proper position for left hand cutting to be performed on a workpiece. Alternatively, those cutting blade positioning slots not being used for a particular hand of cutting may be left empty or may be plugged to prevent contamination due to by-products of the cutting process.

If sufficient space exists on a particular gear cutting machine (e.g. U.S. Pat. No. 6,712,566), the repositioning of cutting blades to transition from one hand of cutting to the other may take place while the cutter head remains secured to the tool spindle of the machine. Alternatively, the cutter head may be removed from the machine to reposition the cutting blades and then returned to position on the machine.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter head of a gear cutting tool for bevel and hypoid gears, said cutter head being generally disc-shaped and rotatable about an axis, said cutter head comprising:

a plurality of cutting blade positioning slots arranged in a face of said cutter head, wherein each of said plurality of cutting blade positioning slots extends through said cutter head from said face to an opposed surface of said cutter head;

wherein a first portion of said plurality of blade positioning slots are oriented to accommodate cutting blades whereby said cutter head is operable for right-hand cutting, and wherein a second portion of said plurality of cutting blade positioning slots are oriented to accommodate cutting blades whereby said cutter head is operable for left-hand cutting.

2. The cutter head of claim 1 wherein said first portion of blade positioning slots are oriented at a hook angle.

3. The cutter head of claim 1 wherein said second portion of blade positioning slots are oriented at a hook angle.

4. The cutter head of claim 1 wherein said blade positioning slots are arranged whereby said cutter head is operable for face milling.

5. The cutter head of claim 1 wherein said blade positioning slots are arranged whereby said cutter head is operable for face hobbing.

6. The cutter head of claim 1 wherein said blade positioning slots are arranged whereby said cutter head is operable with at least one of inside cutting blades and outside cutting blades.

7. The cutter head of claim 1 wherein said blade positioning slots are arranged whereby said cutter head is operable with full slot-width cutting blades.

8. The cutter head of claim 1 wherein said blade positioning slots are spaced equally about said cutter head.

9. The cutter head of claim 1 wherein a number of blade positioning slots for right-hand cutting and a number of blade positioning slots for left-hand cutting are equal.

10. The cutter head of claim 1 wherein blade positioning slots for right-hand cutting and blade positioning slots for left-hand cutting are arranged alternatingly about said cutter head.

11. The cutter head of claim 1 wherein said blade positioning slots accommodate cutting blades having a four-sided or five-sided cross-sectional shape.

12. The cutter head of claim 1 wherein said blade positioning slots accommodate cutting blades having a circular or semi-circular cross-sectional shape.

* * * * *